United States Patent
Chien et al.

(10) Patent No.: US 9,962,824 B1
(45) Date of Patent: May 8, 2018

(54) GRIP STRUCTURE FOR LEFT-HANDED AND RIGHT-HANDED USERS

(71) Applicant: K&W TOOLS CO., LTD., Nantou, Nantou County (TW)

(72) Inventors: Kuan-Ting Chien, Nantou (TW); Kung-Jung Ho, Nantou (TW)

(73) Assignee: K&W TOOLS CO., LTD., Nantou, Nantou County (TW)

( * ) Notice: Subject to any disclaimer, the term of this patent is extended or adjusted under 35 U.S.C. 154(b) by 0 days. days.

(21) Appl. No.: 15/480,896

(22) Filed: Apr. 6, 2017

(51) Int. Cl.
*B25G 1/10* (2006.01)
*B25G 3/36* (2006.01)
*B23D 51/01* (2006.01)

(52) U.S. Cl.
CPC ............ *B25G 1/102* (2013.01); *B23D 51/01* (2013.01); *B25G 3/36* (2013.01); *Y10T 16/476* (2015.01)

(58) Field of Classification Search
CPC ..... Y10T 16/43; Y10T 16/421; Y10T 16/422; Y10T 16/476; Y10T 16/466; Y10T 16/469; B25G 1/102; B25G 3/36; B23D 51/01
USPC ............... 16/430, 421, 422; 30/517
See application file for complete search history.

(56) References Cited

U.S. PATENT DOCUMENTS

| | | | | |
|---|---|---|---|---|
| 8,240,395 B2* | 8/2012 | Kamegai | ................ | B23D 51/01 173/162.1 |
| 8,322,040 B2* | 12/2012 | Jimenez | ................ | B23D 51/01 30/517 |
| 9,205,501 B2* | 12/2015 | Field | ...................... | B23D 51/01 |
| 2002/0124353 A1* | 9/2002 | Holland-Letz | ......... | B25G 1/102 16/430 |
| 2003/0115761 A1* | 6/2003 | Lofgren | ................ | B23D 51/01 30/517 |
| 2005/0138820 A1* | 6/2005 | Gist | ...................... | B23D 51/01 30/517 |
| 2007/0101592 A1* | 5/2007 | Wen | ...................... | B23D 51/01 30/517 |
| 2008/0092396 A1* | 4/2008 | Wang | .................... | B23D 51/01 30/166.3 |
| 2017/0087648 A1* | 3/2017 | Wang | .................... | B23D 51/10 |

\* cited by examiner

*Primary Examiner* — William Miller
(74) *Attorney, Agent, or Firm* — Muncy, Geissler, Olds & Lowe, P.C.

(57) ABSTRACT

A grip structure includes a grip base and a grip mounted with or dismounted from the grip base along a first direction. When being disposed on the grip base, the grip can be applied with an external force to move together with the grip base along a second direction non-parallel to the first direction. The grip has a finger abutting portion formed on the circumferential surface of the grip along the first direction for the fingers of the user to be abutted thereon. Therefore, the grip is changeable in the direction relative to the grip base according to the dominant hand of the user in a way that the finger abutting portion is toward the left side of the grip base for the right-handed user and toward the right side of the grip base for the left-handed user, thereby improved in the convenience of usage and hand feel.

17 Claims, 8 Drawing Sheets

GRIP STRUCTURE FOR LEFT-HANDED AND RIGHT-HANDED USERS

BACKGROUND OF THE INVENTION

1. Field of the Invention

The present invention relates to grip structures and more particularly, to a grip structure for left-handed and right-handed users.

2. Description of the Related Art

The conventional hand tool, such as the saw, is primarily handled by the hand of the user holding the hand tool. For improving the effect of being handled by the user, the hand tool is usually provided at a terminal end thereof with a grip structure conforming to ergonomics, allowing the user to hold the grip structure perfectly and apply force conveniently.

However, in the prior art, the related dealers should manufacture two kinds of grip structures adapted for the left hand and the right hand respectively for matching the dominant hands of different users, that can satisfy the usage requirements of the users but certainly increases the manufacturing cost. Therefore, in consideration of the manufacturing cost, a part of the dealers manufacture the grip structure adapted for both the left hand and the right hand. But such grip structure for both the left and right hands is not good in hand feel, thereby more difficultly applied with force when being handled.

SUMMARY OF THE INVENTION

It is a primary objective of the present invention to provide a grip structure which is changeable in usage mode according to the dominant hand of the user, thereby increased in the convenience of usage, lowered in manufacturing cost, and good in hand feel of usage.

To attain the above objective, the grip structure of the present invention includes a grip base and a grip. The grip base has a first lateral surface and a second lateral surface opposite to the first lateral surface. The grip is detachably disposed on the grip base and changeable between a right-hand usage mode and a left-hand usage mode by being mounted with or dismounted from the grip base along a first direction, so that the grip is able to be applied with an external force to move together with the grip base along a second direction non-parallel to the first direction. Besides, the grip has a finger abutting portion formed on a circumferential surface of the grip along the first direction for the fingers of the user to be abutted on the finger abutting portion to apply force conveniently.

It can be known from the above description that when the grip is in the right-hand usage mode for the user whose dominant hand is the right hand, the finger abutting portion of the grip and the first lateral surface of the grip base are located on the same side. When the grip is in the left-hand usage mode for the user whose dominant hand is the left hand, the finger abutting portion of the grip and the second lateral surface of the grip base are located on the same side. In other words, the grip structure of the present invention allows the user to change the usage mode of the grip according to the dominant hand of the user, thereby increased in the convenience of usage, lowered in manufacturing cost, and good in hand feel of usage.

Preferably, the finger abutting portion is protruded out of the circumferential surface of the grip along the first direction. Besides, a pass-through space is formed between the grip and the grip base. The finger abutting portion of the grip is arc-shaped and provided with an opening toward the pass-through space. In this way, when the hand of the user holds the grip, the thumb is abutted on the circumferential surface of the grip, and the other four fingers are inserted in the pass-through space and placed on the finger abutting portion at the opening thereof, so that the user can apply force to the grip conveniently.

Preferably, the grip base has a base body provided at an end thereof with a saw blade fastening groove; a cantilever portion is extended away from the saw blade fastening groove from another end of the base body along the second direction; an end of the grip is detachably mounted to a terminal end of the cantilever portion. In this way, the pass-through space is formed between the base body of the grip base, the cantilever portion of the grip base and the grip.

Preferably, the cantilever portion of the grip base has a through hole; the grip has a threaded hole; the grip is fastened to the cantilever portion of the grip base by a fastener inserted through the through hole of the cantilever portion of the grip base and screwed into the threaded hole of the grip.

Preferably, the cantilever portion of the grip base has an embedding groove communicating with the through hole and extended along a direction parallel to the first direction; the grip is provided at each of two ends thereof with an embedding portion and embedded in the embedding groove by one of the embedding portions. In this way, the grip can be positioned on the grip base quickly for the convenience of the follow-up being fastened. On the other hand, the grip in use can be prevented from being rotated and affecting the user handling the grip structure.

The detailed structure, features and assembling or using manner of the grip structure of the present invention will be specified in the detailed description of the embodiments given hereinafter. However, those skilled in the field of the present invention should understand that the detailed description and the specific embodiments instanced for the implementing of the invention are given for illustration only, not for limiting the scope of the invention.

DETAILED DESCRIPTION OF THE INVENTION

The technique and features of the present invention will be fully described in the instanced preferred embodiments given herein below and the accompanying drawings. The directional terms 'front', 'rear', 'left', 'right', 'top' and 'bottom' mentioned in the present invention are just for illustrative description on the basis of normal usage direction, not intended to limit the claimed scope.

Figure 1:
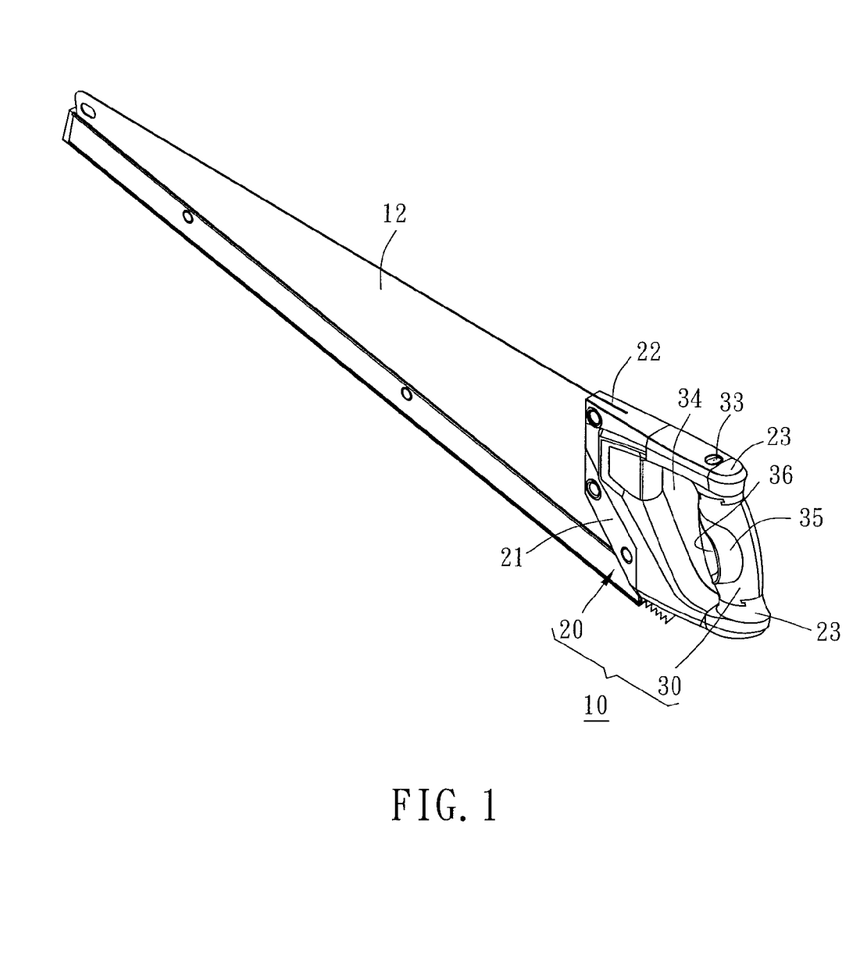
FIG. 1 is a perspective view of the appearance of a grip structure according to a first embodiment of the present invention and a saw blade used with the grip structure.
Figure 2:
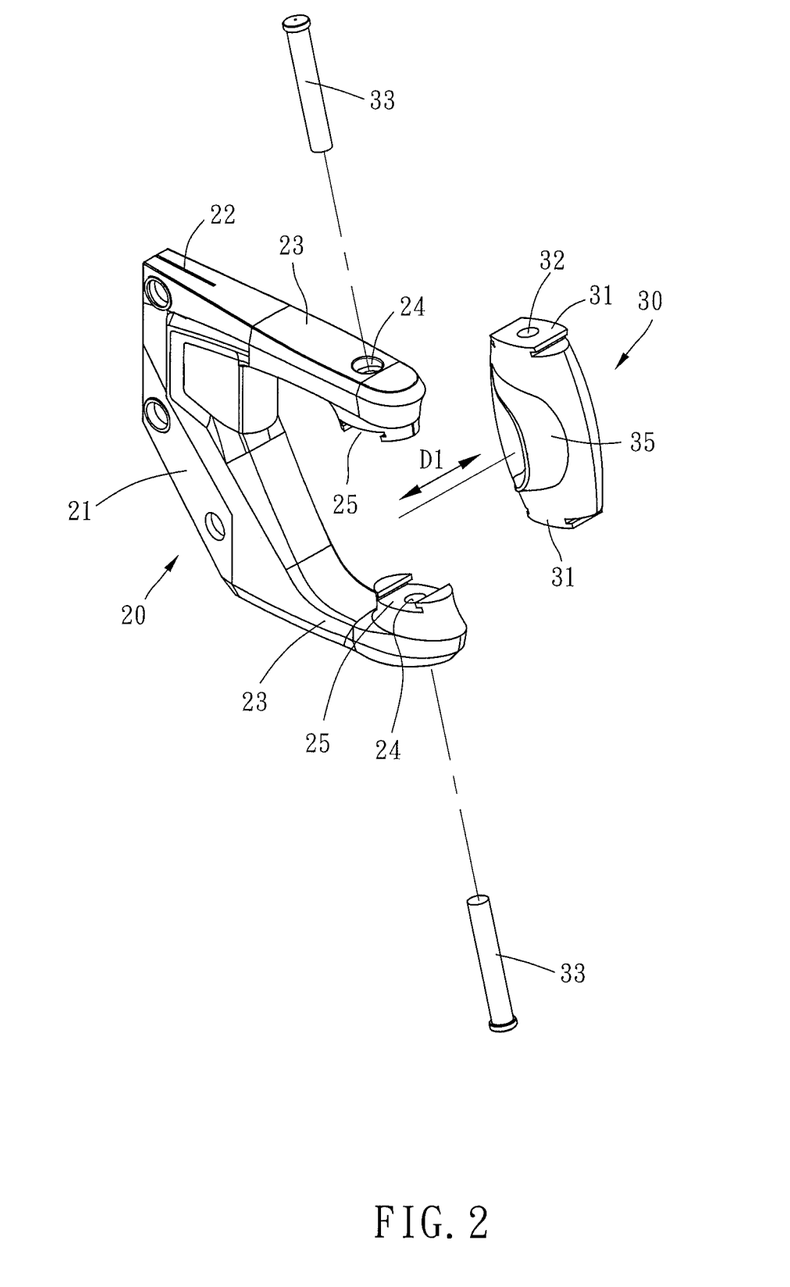
FIG. 2 is an exploded perspective view of the grip structure according to the first embodiment of the present invention.
Figure 3:
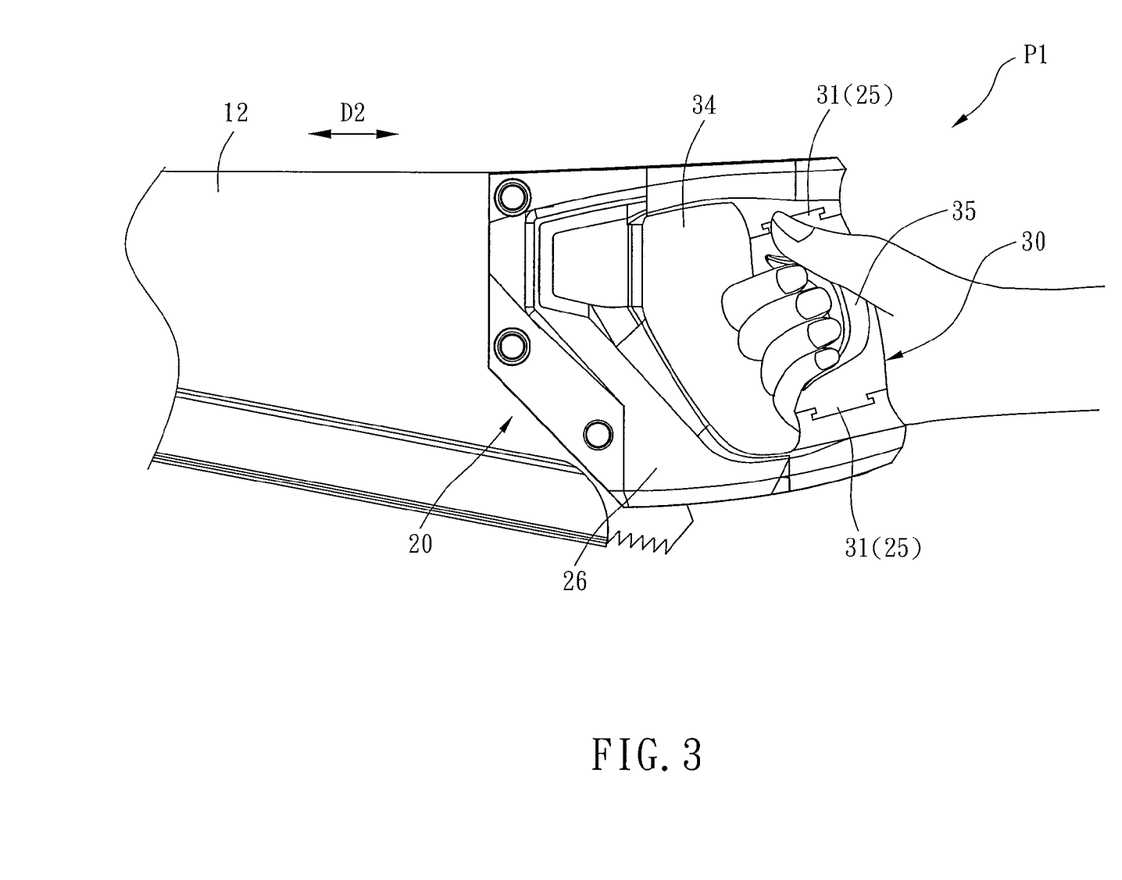
FIG. 3 is a planar view of the grip structure according to the first embodiment of the present invention in the right-hand usage mode and the saw blade used with the grip structure.

Referring to FIGS. 1-3, the grip structure 10 of the present invention includes a grip base 20 and a grip 30.

The grip base 20 has a first lateral surface 26 and a second lateral surface 27 opposite to the first lateral surface 26. In the normal usage condition, the first lateral surface 26 corresponds to the left side of the user, and the second lateral surface 27 corresponds to the right side of the user. The grip base 20 has a base body 21 provided at a front end thereof with a saw blade fastening groove 22 for a saw blade 12 to be fixedly inserted therein. Two cantilever portions 23 facing each other are extended away from the saw blade fastening groove 22 from a rear end of the base body 21 along a second direction D2. Each of the two cantilever portions 23 is provided at a terminal end thereof with a through hole 24 and an embedding groove 25 communicating with the through hole 24, and the embedding grooves 25 are located on the sides of the cantilever portions 23 facing each other. The embedding groove 25 is extended along a direction parallel to a first direction D1 non-parallel to the second direction D2. In this embodiment, the first direction D1 is perpendicular to the second direction D2.

Figure 4:
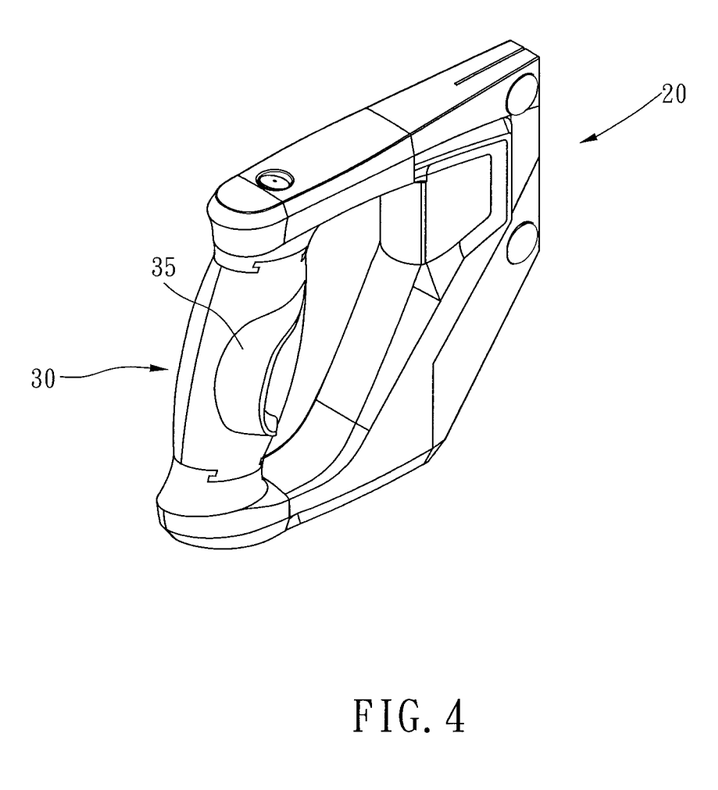
FIG. 4 is a perspective view of the appearance of the grip structure according to the first embodiment of the present invention in the left-hand usage mode.
Figure 5:
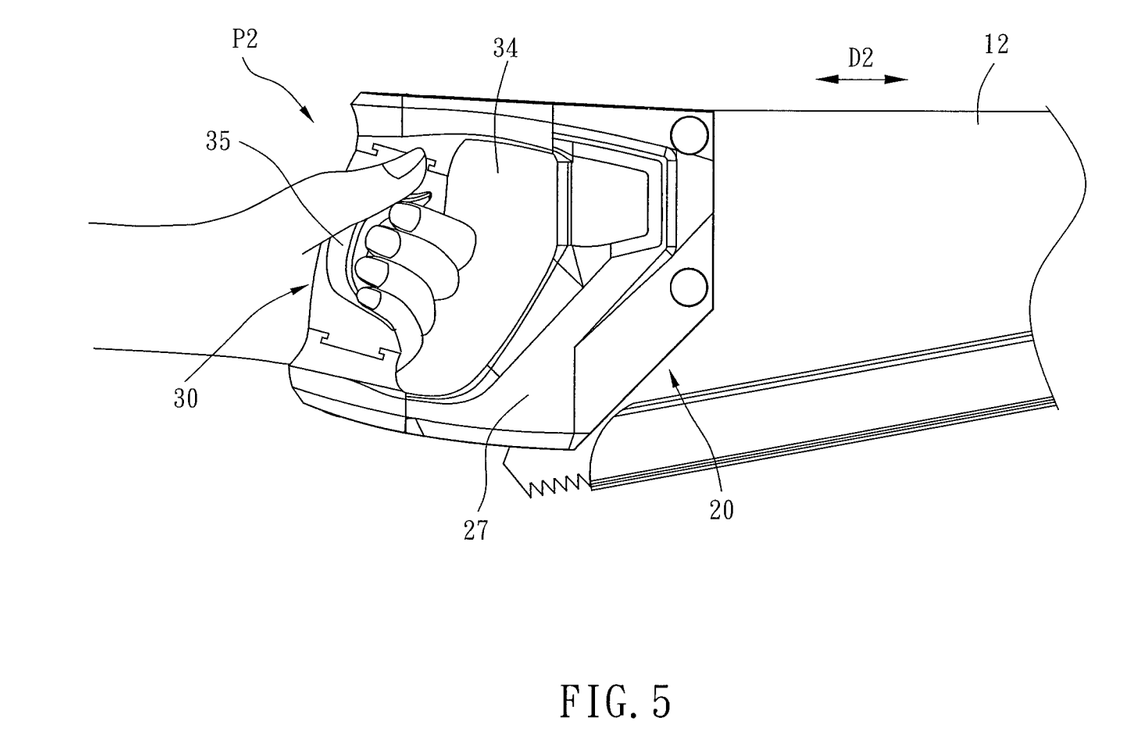
FIG. 5 is a planar view of the grip structure according to the first embodiment of the present invention in the left-hand usage mode and the saw blade used with the grip structure.

The grip 30 is provided at each of top and bottom ends thereof with an embedding portion 31 and a threaded hole 32 located on the embedding portion 31. When being mounted with the grip base 20, the grip 30 is firstly positioned in a way that the embedding portions 31 are embedded in the embedding grooves 25 of the cantilever portions 23 of the grip base 20 along the first direction D1, and then fastened in a way that two bolts 33 are respectively inserted through the through holes 24 of the cantilever portions 23 of the grip base 20 and screwed into the threaded holes 32 of the grip 30. At this time, a pass-through space 34 is formed between the base body 21 of the grip base 20, the two cantilever portions 23 of the grip base 20 and the grip 30. In the process that the grip 30 is removed, the grip 30 is dismounted from the grip base 20 along the first direction D1 after the two bolts 33 are removed. Besides, the grip 30 has a finger abutting portion 35 protruded out of the circumferential surface of the grip 30 along the first direction D1. The finger abutting portion 35 is arc-shaped and provided with an opening 36 toward the pass-through space 34. It can be known from the above description that if the grip 30 is firstly mounted with the grip base 20 for matching the user whose dominant hand is the right hand, the grip 30 after being mounted with the grip base 20 should be in a right-hand usage mode P1 wherein the finger abutting portion 35 and the first lateral surface 26 of the grip base 20 (i.e. the left side of the user) are located on the same side, as shown in FIGS. 1 and 3. If the grip structure is to be handled by the user whose dominant hand is the left hand, the grip 30 should be firstly dismounted from the grip base 20 and then remounted with the grip base 20 after being turned vertically and horizontally, thereby changed to a left-hand usage mode P2 wherein the finger abutting portion 35 of the grip 30 and the second lateral surface 27 of the grip base 20 (i.e. the right side of the user) are located on the same side, as shown in FIGS. 4 and 5. However, no matter which direction the finger abutting portion 35 of the grip 30 faces toward, the hand of the user holds the grip 30 in a way that the thumb is abutted on the circumferential surface of the grip 30 and the other four fingers are inserted in the pass-through space 34 and placed on the finger abutting portion 35 at the opening 36 thereof. In this way, the user can start to apply force to the grip 30 along the second direction D2. At this time, the grip 30 and the grip base 20 are moved together forwards and backwards along the second direction D2, allowing the saw blade 12 fixed to the grip base 20 to do the cutting. Besides, in the process that the grip 30 is applied with force, the embedding between the embedding portions 31 and the embedding grooves 25 can prevent the grip 30 from being rotated and affecting the user handling the grip structure.

On the other hand, the grip base is unlimited to be used with the saw blade 12 and variable in structure. For example, in the second embodiment of the present invention shown in FIGS. 6-8, the grip base 40 is provided at an end thereof with a fastening hole 42 for an end of a pipe 14 to be fixedly inserted in the fastening hole 42. The grip base 40 is provided at another end thereof with a cantilever portion 44 which has a countersunk hole 46 and an embedding groove 48 communicating with the countersunk hole 46. The grip 50 has a bolt hole 54. The grip 50 is fastened to the cantilever portion 44 of the grip base 40 by a bolt 60 which is inserted through the bolt hole 54 and screwed with a nut 62 disposed in the countersunk hole 46.

Figure 6:
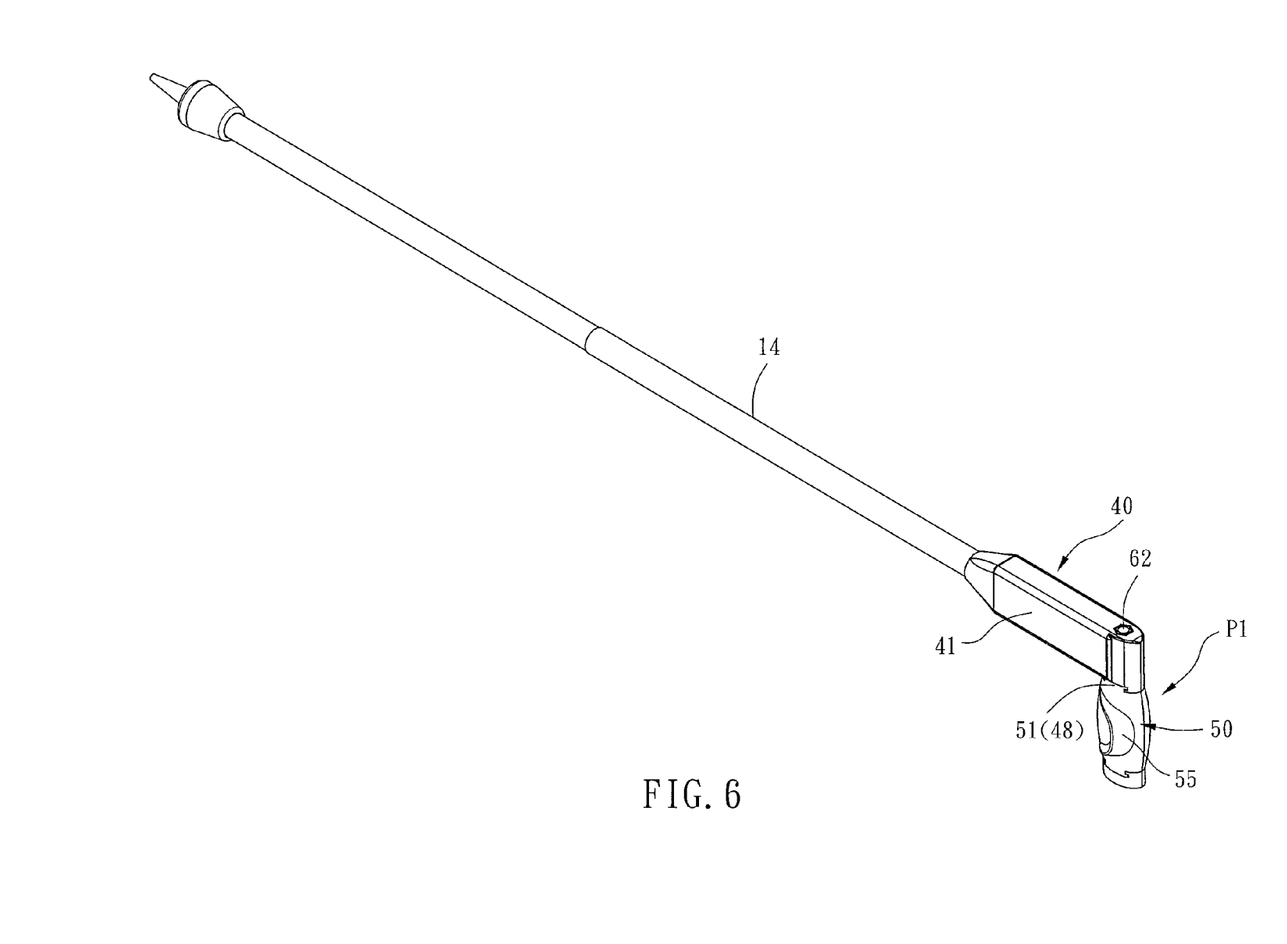
FIG. 6 is a perspective view of the appearance of a grip structure according to a second embodiment of the present invention in the right-hand usage mode and a pipe used with the grip structure.
Figure 7:
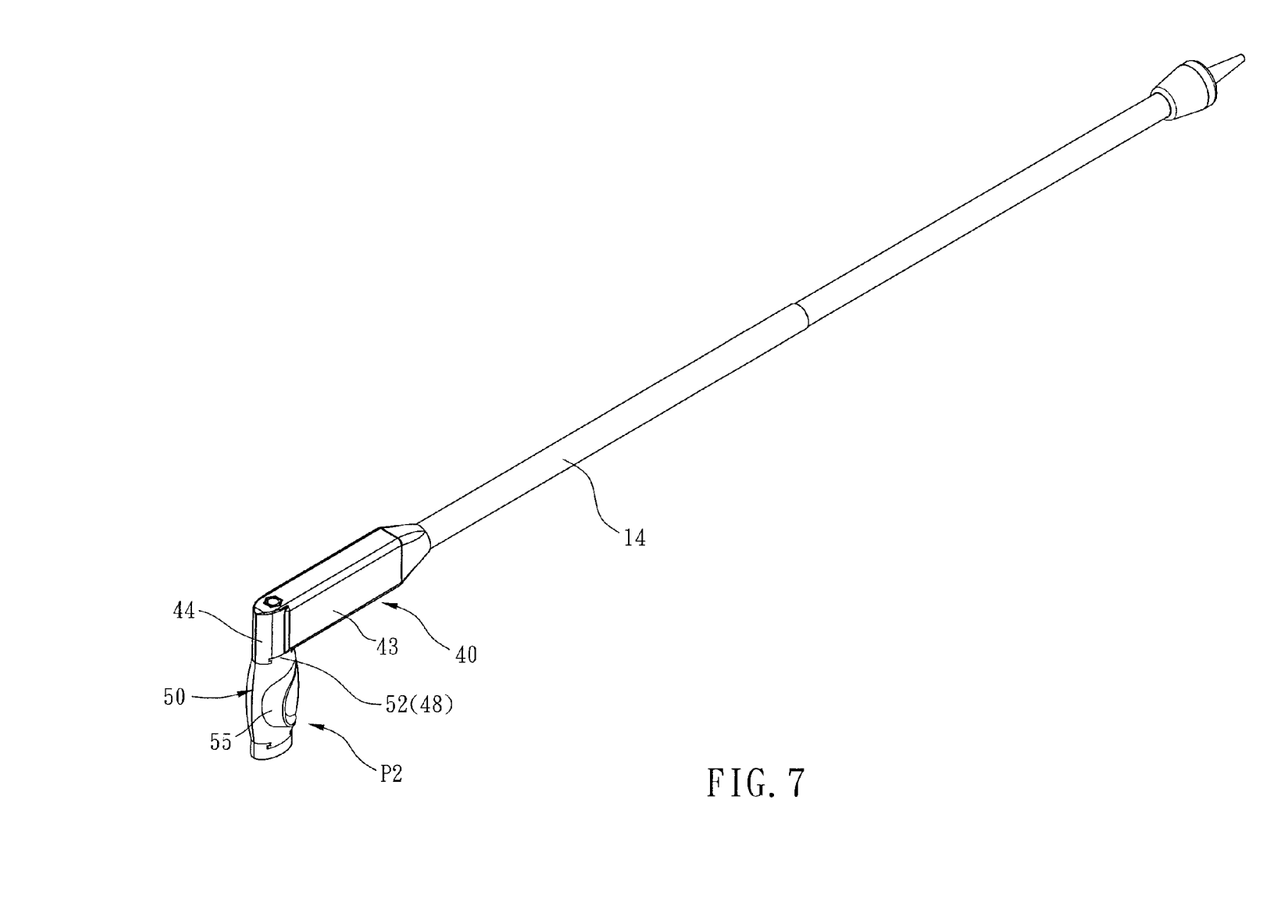
FIG. 7 is a perspective view of the appearance of the grip structure according to the second embodiment of the present invention in the left-hand usage mode and the pipe used with the grip structure.
Figure 8:
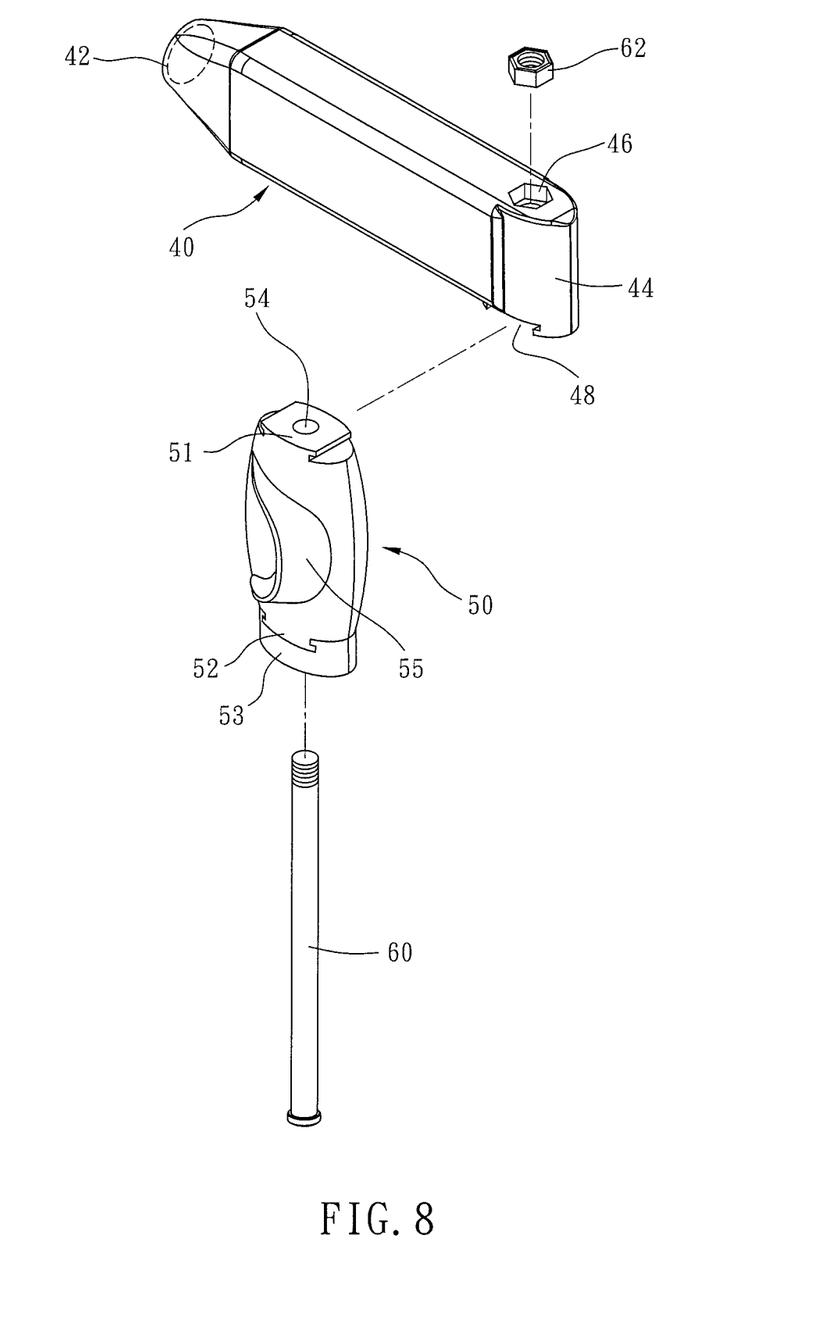
FIG. 8 is an exploded perspective view of the grip structure according to the second embodiment of the present invention.

Besides, the grip 50 is provided at an end thereof with a first embedding portion 51, and provided at another end thereof with a second embedding portion 52. When the grip 50 is in the right-hand usage mode P1 as shown in FIG. 6 for matching the user whose dominant hand is the right hand, the grip 50 is positioned in a way that the first embedding portion 51 is embedded in the embedding groove 48 of the cantilever portion 44 of the grip base 40 and the second embedding portion 52 of the grip 50 is embedded in a terminal cap 53, so that the grip 50 is disposed in a way that the finger abutting portion 55 and the first lateral surface 41 of the grip base 40 (i.e. the left side of the user) are located on the same side. Then, if the grip structure is to be matched with the user whose dominant hand is the left hand, the grip 50 is firstly dismounted from the grip base 40, then the terminal cap 53 is dismounted from the second embedding portion 52 of the grip 50 and embedded with the first embedding portion 51 of the grip 50, and at last the grip 50 is remounted with the grip base 40 after being turned vertically and horizontally, thereby changed to the left-hand usage mode P2 as shown in FIG. 7 wherein the finger abutting portion 55 of the grip 50 and the second lateral surface 43 of the grip base 40 (i.e. the right side of the user) are located on the same side.

In conclusion, the grip structure 10 of the present invention allows the user to change the usage mode of the grip 30, 50 for matching the dominant hand of the user. Compared with the conventional grip structure for single dominant hand or both the left and right hands, the grip structure of the present invention is effectively improved in the convenience of usage, good in hand feel of usage, and also lowered in manufacturing cost.

What is claimed is:

1. A grip structure comprising:
a grip base having a first lateral surface and a second lateral surface opposite to the first lateral surface; and
a grip changeably between a right-hand usage mode and a left-hand usage mode and detachably mounted with the grip base along a first direction, so that the grip is able to be applied with an external force to move together with the grip base along a second direction non-parallel to the first direction, the grip having a finger abutting portion formed on a circumferential surface of the grip along the first direction, the finger abutting portion of the grip and the first lateral surface of the grip base being located on a same side when the grip is in the right-hand usage mode, the finger abutting portion of the grip and the second lateral surface of the grip base being located on another same side when the grip is in the left-hand usage mode;
wherein a pass-through space is formed between the grip and the grip base; the finger abutting portion of the grip is arc-shaped and provided with an opening toward the pass-through space.

2. The grip structure as claimed in claim 1, wherein the finger abutting portion is protruded out of the circumferential surface of the grip along the first direction.

3. The grip structure as claimed in claim 2, wherein the grip base has a base body provided at an end thereof with a fastening hole; a cantilever portion is extended away from the fastening hole from another end of the base body along the second direction; an end of the grip is detachably mounted to a terminal end of the cantilever portion, so that the pass-through space is formed between the base body of the grip base, the cantilever portion of the grip base and the grip.

4. The grip structure as claimed in claim 3, wherein the cantilever portion of the grip base has a countersunk hole; the grip has a bolt hole; the grip is fastened to the cantilever portion of the grip base by a bolt inserted through the bolt hole and screwed with a nut disposed in the countersunk hole.

5. The grip structure as claimed in claim 4, wherein the cantilever portion of the grip base has an embedding groove communicating with the countersunk hole and extended along a direction parallel to the first direction; the grip is provided at each of two ends thereof with an embedding portion and detachably embedded in the embedding groove by one of the embedding portions.

6. The grip structure as claimed in claim 5 further comprising a terminal cap which is detachably disposed on the other embedding portion of the grip.

7. The grip structure as claimed in claim 2, wherein the grip base has a base body provided at an end thereof with a saw blade fastening groove; two cantilever portions facing each other are extended away from the saw blade fastening groove from another end of the base body along the second direction; two opposite ends of the grip are detachably mounted to terminal ends of the cantilever portions respectively, so that the pass-through space is formed between the base body of the grip base, the cantilever portions of the grip base and the grip.

8. The grip structure as claimed in claim 7, wherein each of the cantilever portions of the grip base has a through hole; the grip is provided at each of said two opposite ends thereof with a threaded hole; the grip is fastened to the cantilever portions of the grip base by two bolts respectively; each of the bolts is inserted through a said through hole and screwed into a said threaded hole.

9. The grip structure as claimed in claim 8, wherein each of the cantilever portions of the grip base has an embedding groove communicating with the through hole and extended along a direction parallel to the first direction; the grip is provided at each of said two opposite ends thereof with an embedding portion; each said embedding portion is detachably embedded in a said embedding groove and provided with a said threaded hole.

10. The grip structure as claimed in claim 1, wherein the grip base has a base body provided at an end thereof with a fastening hole; a cantilever portion is extended away from the fastening hole from another end of the base body along the second direction; an end of the grip is detachably mounted to a terminal end of the cantilever portion, so that the pass-through space is formed between the base body of the grip base, the cantilever portion of the grip base and the grip.

11. The grip structure as claimed in claim 10, wherein the cantilever portion of the grip base has a countersunk hole; the grip has a bolt hole; the grip is fastened to the cantilever portion of the grip base by a bolt inserted through the bolt hole and screwed with a nut disposed in the countersunk hole.

12. The grip structure as claimed in claim 11, wherein the cantilever portion of the grip base has an embedding groove communicating with the countersunk hole and extended along a direction parallel to the first direction; the grip is provided at each of two ends thereof with an embedding portion and detachably embedded in the embedding groove by one of the embedding portions.

13. The grip structure as claimed in claim 12 further comprising a terminal cap which is detachably disposed on the other embedding portion of the grip.

14. The grip structure as claimed in claim 1, wherein the grip base has a base body provided at an end thereof with a saw blade fastening groove; two cantilever portions facing each other are extended away from the saw blade fastening groove from another end of the base body along the second direction; two opposite ends of the grip are detachably mounted to terminal ends of the cantilever portions respectively, so that the pass-through space is formed between the base body of the grip base, the cantilever portions of the grip base and the grip.

15. The grip structure as claimed in claim 14, wherein each of the cantilever portions of the grip base has a through hole; the grip is provided at each of said two opposite ends thereof with a threaded hole; the grip is fastened to the cantilever portions of the grip base by two bolts respectively; each of the bolts is inserted through a said through hole and screwed into a said threaded hole.

16. The grip structure as claimed in claim 15, wherein each of the cantilever portions of the grip base has an embedding groove communicating with the through hole and extended along a direction parallel to the first direction; the grip is provided at each of said two opposite ends thereof with an embedding portion; each said embedding portion is detachably embedded in a said embedding groove and provided with a said threaded hole.

17. The grip structure as claimed in claim 1, wherein the first direction is perpendicular to the second direction.

\* \* \* \* \*